Richard W. Leep
Richard L. Pasley
INVENTORS

BY

Robert De White

ATTORNEY

Richard W. Leep
Richard L. Pasley
INVENTORS

United States Patent Office 3,427,872
Patented Feb. 18, 1969

3,427,872
METHOD AND SYSTEM FOR INVESTIGATING THE STRESS CONDITION OF MAGNETIC MATERIALS
Richard W. Leep, Los Alamos, N. Mex., and Richard L. Pasley, San Antonio, Tex., assignors to Southwest Research Institute, Bexar County, Tex., a trust estate of Texas
Filed Oct. 5, 1966, Ser. No. 584,543
U.S. Cl. 73—88.5                                   15 Claims
Int. Cl. G01n 27/72, 27/80

ABSTRACT OF THE DISCLOSURE

The Barkhausen effect, the series of abrupt changes or jumps in the magnetization of a substance when the magnetizing field is gradually altered, may be employed as the basis for a stress investigation of such substance. A qualitative indication results from the fact that appreciable tensile stress is accompanied by substantial Barkhausen "noise," and appreciable compressive stress produces relatively little. Quantitative data may be obtained through the use of calibration procedures with known loads. The method and system for practicing same basically involve creating the Barkhausen noise and detecting, demodulating and displaying it for observation and analysis.

---

The present invention relates to a method for nondestructive investigation of the stress condition at a given point or over a given area in a magnetic material. It also contemplates a system of apparatus for accomplishing this goal.

For purposes of describing this invention, it is necessary to briefly discuss certain physical phenomena, and to define certain terms as used herein. In ferromagnetic materials, an applied magnetic field produces a flux density which may be greater than that due to the magnetizing current alone by several orders of magnitude. Thus it is clear that some influence other than the applied field is responsible, and it has been concluded such influence involves a mutual interaction between molecules, an effect which is slight in paramagnetic and diamagnetic substances.

In the recent past, there has been achieved a fairly complete understanding of the nature of these interactions, and the accepted theory is based upon the so-called domain concept. Briefly, this relates to the existence in ferromagnetic materials of small regions called domains, in each of which, as a result of molecular interaction, the molecular magnetic moments are all aligned parallel to one another. In other words, each domain is spontaneously magnetized to saturation even in the absence of an external field. The directions of magnetization of the various domains are random, so in a given specimen, in the absence of an applied field, the total magnetization is zero. When such specimen is placed in a magnetic field, the resultant magnetization may increase in two different ways, either by an increase in the volume of those domains which are favorably oriented with respect to the field at the expense of unfavorably oriented domains, or by rotation of the direction of magnetization toward the direction of the field.

In considering this behavior it is helpful to refer to a so-called magnetization curve in which the flux density (conventionally identified by the symbol B) in an initially unmagnetized ferromagnetic material is plotted against the magnetic intensity (H) of an applied field which is steadily increased from zero. A B–H curve shows a relatively gentle upward trend initially, then a steep portion over an intermediate range of intensity, and finally a return to a gentle slope in stronger fields. In terms of domain theory, very weak fields cause some movement of the domain walls, but such movement is reversible. This is to say that when the field is removed, the walls return to their initial positions. Over the intermediate intensity range where the B–H curve rises steeply, the domains are changed irreversibly, i.e., the walls remain in the new position after the applied field is removed. At the upper portion of the magnetization curve where the applied field is relatively strong, the domains change by rotation in the direction of magnetization, and there is relatively little variation in domain size.

Associated with the movement of domain walls is a phenomenon commonly known as the Barkhausen effect, defined in Webster's New International Dictionary (third edition) as "The series of abrupt changes or jumps in the magnetization of a substance when the magnetizing field is gradually altered." For purposes of this invention, it is not necessary to discuss the theories regarding why such changes occur abruptly or in "jumps," but it should be noted that they can be detected in several ways, one of which involves placing a search coil adjacent the test specimen and connecting it to an audio amplifier and speaker. The crackling sounds which are heard from the speaker as the domain boundaries move abruptly are called Barkhausen noise.

The present invention relies on the Barkhausen effect, and it involves a special use of the changes in internal magnetization which occur abruptly as the applied magnetic field is altered. Thus the term "Barkhausen signal" is employed herein to denote the manifestation in useful form for purposes of stress investigation of the abruptly changing boundaries; it is distinguished from the conventional term "Barkhausen noise" which identifies merely the audible evidence that a change in internal magnetization has occurred.

Although the Barkhausen effect customarily is described with reference to ferromagnetic materials, the domain theory in ferromagnetics has a very close analogy in ferroelectric materials, including the concept of irreversible processes which are associated with the Barkhausen effect. However, the present invention finds its primary application with regard to ferromagnetic materials and the general term magnetic is employed herein to embrace such materials.

As the magnetic moments within a body of ferromagnetic material are determined in part by the crystal structure or molecular orientation of the material, the internal strains caused by loading, either applied or residual, influence the magnetic characteristics. In general, the domains aligned favorably to the axis of the applied stress grow larger at the expense of domains less favorably oriented. Thus, in principle if not in practice, the sense of an applied stress, compressive or tensile, could be determined by noting the polarization of a domain and the direction in which the domain wall moved upon application of the stress, taking cognizance of the magnetostriction coefficient, of the material. Specifically, for a ferromagnetic material with a positive magnetostriction coefficient, applied stresses will tend to enlarge domains which are aligned either parallel or antiparallel (directly opposed) to the tensile axis of the stress at the expense of domains aligned in other directions. This result, coupled with the fact that applied magnetic fields tend to enlarge domains aligned in the direction of the applied field at the expense of those not aligned with the field forms the basis for the present invention. It has been found that by deriving a Barkhausen signal and expressing it in terms of the factors involved in its derivation, including applied loads and/or applied magnetic fields, excellent qualitative indications of the stress condition of the material can be obtained, and under favorable circumstances, quantitative data can be obtained.

For convenience in describing the present invention, the term stress is employed to identify broadly the condition of a material resulting from the application of a load. As stress and strain are directly proportional within the elastic limit of a material, the two terms are substantially synonymous for present purposes over such range, but it is to be understood that the information obtained by the present method and system can be correlated with and expressed in terms of stress or strain even beyond the elastic limit of the material under investigation.

With the foregoing general observations, it can be stated that a primary object of the present invention is to provide a method and system for measuring stress in magnetic materials through analysis of a Barkhausen signal derived therefrom.

A more particular object of the invention is to provide a method and system for investigating the stress in magnetic materials by analysis of the Barkhausen signal derived from the observed Barkhausen effect produced by the application of electromagnetic or mechanical forces.

It is a more specific object of this invention to ascertain by non-destructive testing which does not require direct contact, the stress condition within a body of magnetic material, with regard not only to the sense of such stress, tensile or compressive, but also direction and approximate magnitude.

It also is an object of this invention to provide a method and system for stress analysis which involves comparison of the Barkhausen signal derived from a specimen comparable in material and other pertinent characteristics whose behavior has been investigated under known conditions, such comparison standard being identified herein as an analogue specimen.

It also is an object of this invention to provide a method and system for non-destructive investigation of the stress condition of an object while it is in its customary environment and loaded in its customary manner.

It is a further object to provide a system for non-destructive stress analysis which involves a relatively simple magnetic transducing device for detecting Barkhausen noise and converting same to a form suitable for comparison and analysis.

The foregoing objects, as well as others which will become apparent, are achieved by the method and system described hereinafter in conjunction with the following drawings in which.

Figure 1:
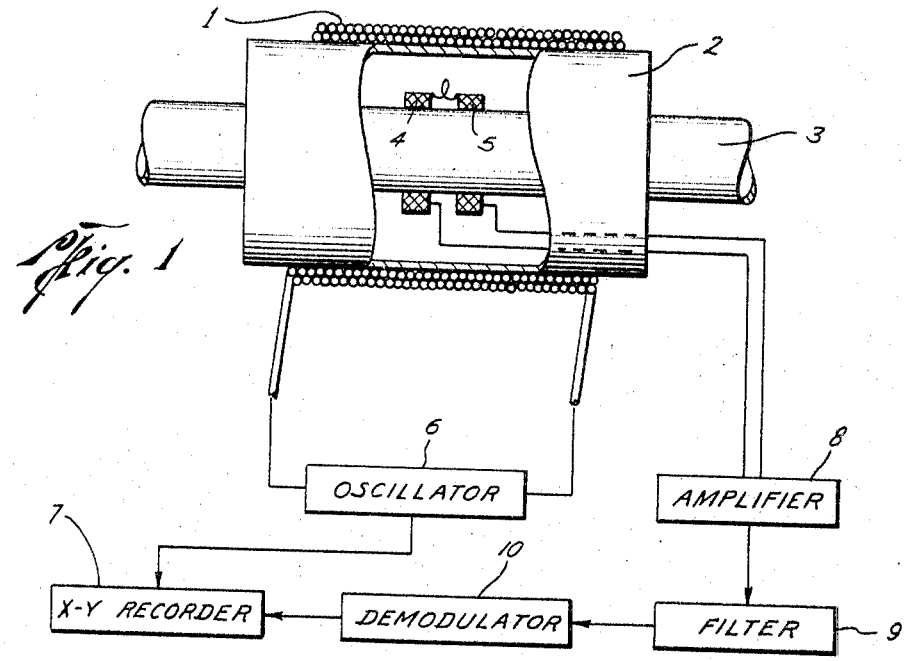
FIG. 1 is a generally schematic diagram of a system suitable for practicing the invention.

Referring now to FIGURE 1, there is shown one system adapted to apply a magnetic field to a test specimen, and to derive and record the Barkhausen signal which emanates therefrom during variations in the intensity of such magnetic field over a selected range. This apparatus is intended to investigate a test specimen of such size and configuration as to be accommodated within a magnetizing coil. More specifically, a coil indicated by reference numeral 1 is wound about a non-conducting support mandrel 2. The test specimen 3 is placed within the cylindrical chamber defined by the mandrel 2, and it is surrounded by small detecting coils 4 and 5.

The oscillator 6 energizes the coil 1 over a range of current chosen to encompass the maximum value of a derived Barkhausen signal. The output of the oscillator also is connected to the x-axis of an x–y recorder 7 which will display instantaneous values of the energizing current in conjunction with a corresponding input to the y function.

The pick-up coils 4 and 5 preferably are annular with their common axis coincident with that of the magnetizing coil 1. They are wired in series opposition and connected to the y-axis of the x–y recorder 7 through a voltage amplifier 8, electronic filter 9 and demodulator circuit 10 the latter elements being represented in block form in FIGURE 1. In the present context the operation identified as demodulating the output of the pick-up coils is intended to denote broadly the extraction of intelligence from a complex signal in which it is contained.

It is apparent that the recorder 7 will present a record in which a Barkhausen signal can be generated and disverted to the form identified herein as a Barkhausen signal by the amplifier, filter and demodulator, are plotted against the variations in the energizing current in magnetizing coil 1. Specific examples of the type of record obtained and the manner in which stress information is obtained therefrom will be presented subsequently herein.

Figure 2:
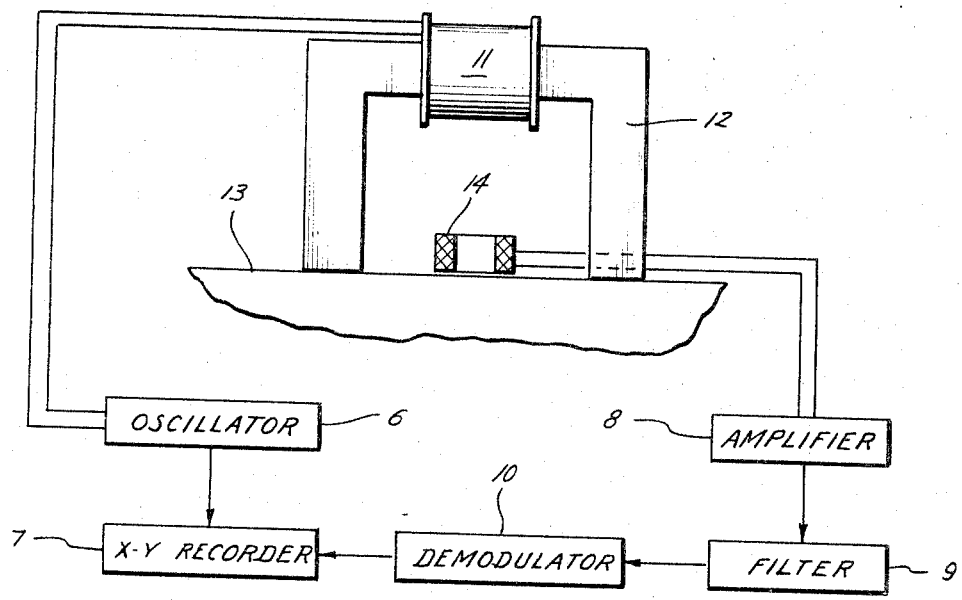
FIG. 2 is a generally schematic diagram of another system suitable for practicing the invention.

FIGURE 2 represents a system which is comparable in function to that shown in FIGURE 1. The magnetizing coil 11 is wound on a U shaped core 12, current being supplied to the coil 11 by an oscillator bearing reference numeral 6 as in FIGURE 1. Also as in FIGURE 1, the output of the oscillator is connected to the x-axis of an x–y recorder 7. The U-shaped core 12 fits against the surface of the test specimen 13, and a magnetic field readily can be applied to any accessible area of interest on the specimen.

A detector coil 14 having a large number of turns of wire for maximum sensitivity is placed adjacent to the specimen. As in FIGURE 1, the output of the coil 14 is connected to an amplifier 8, filter 9, demodulator circuit 10 and the y-axis of the x–y recorder 7.

The systems of FIGURES 1 and 2 illustrate the manner in which a Barkhausen signal can be generated and displayed in useable form. They differ from each other only in that the FIGURE 1 unit is particularly suited to test specimens of a size and shape which can be accommodated within a cylindrical energizing coil, whereas the FIGURE 2 unit is suited for use with a large item, or one which may not be conveniently removed from its customary mounting for testing.

Magnetic domains vary in size over a wide range, but typical values might extend from one hundredth to one millionth of a cubic centimeter. Thus any practical device for detecting and responding to moving domain walls will reflect a weighted average of the reactions from a large number of domains, and the resultant signal will be influenced by the size, shape and orientation of the detector relative to the specimen surface. These considerations will be of importance in designing the components for use in the systems of FIGURES 1 and 2.

In this regard, the necessary components can be accommodated within a transducer unit sufficiently small in size to be inserted within a confined area to provide relatively localized measurements on a test specimen. Such transducer unit consists of a small U-shaped iron core surrounded by an energizing coil with a small detector coil placed between the two parallel sides of the core as in FIG. 2. The leads for both the energizing coil and the detector coil are within a single cable and connected to a readily transported control unit which contains the oscillator, amplifier, filter and an appropriate read-out device.

Instead of the x–y recorder 7 shown in FIGURES 1 and 2, a millivoltmeter with a deflecting needle can be mounted within the control unit. With such device, the direction of the principal stress within a test specimen can be quickly determined by rotating the transducer in small increments about its own axis between successive energizing cycles, and observing the meter in the control unit until a maximum value for the derived Barkhausen signal is obtained.

Versatility is obtained in such unit by providing a suitable control for the oscillator circuit so both the range and frequency of the oscillating current are adjustable to the characteristics of a particular test specimen. Qualitative stress determinations can be made by such unit with ease and speed, and if investigation in more detail is desired, provisions can be made for plugging the two functions of the control unit into an x–y recorder, visual or graphic.

It will be apparent that a Barkhausen signal can be derived in a number of ways, i.e., the demodulation of the signal from the detector coil can be varied according to the requirements of a particular situation, or a particular type of read-out device. It has been found to be particularly suitable to rectify and then integrate the Barkhausen noise pulses, thus creating a record of the type shown in FIGURE 3. It will be noted that this figure plots magnetic intensity (H), which of course is a function of the current in the energizing coil of the apparatus of FIGURES 1 and 2, against the values of the rectified and integrated Barkhausen noise pulses.

Figure 3:
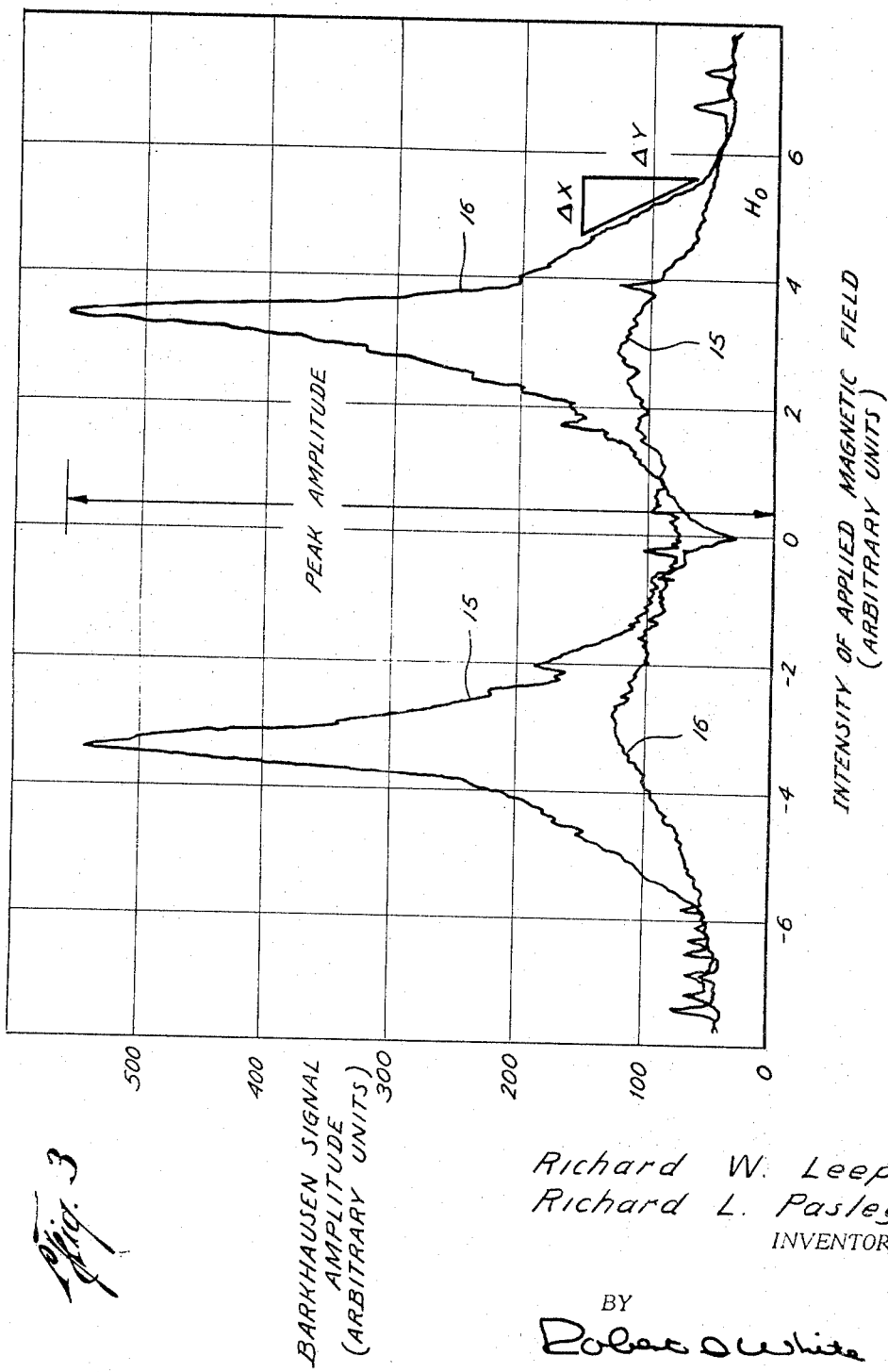
FIG. 3 is a graphic representation of a typical Barkhausen signal obtained from a test specimen as an applied magnetic field was varied over a substantial range including a reversal of direction.

The value of H in FIGURE 3 extends from a substantial level of intensity in one direction, indicated by a negative sign, to the same intensity in the opposite or positive direction, such variation necessarily passing through zero. As the negative field is decreased, approaching zero, the Barkhausen signal amplitude increases to a maximum point, then decreases rapidly to a relatively low level which is subject to little variation over the remainder of the excursion. The Barkhausen signal during the left to right variation is identified by reference numeral 15. As the positive field is reduced, approaching zero, the Barkhausen signal again reaches a peak amplitude, and quickly decreases to a relatively low level which is maintained back to the starting point. This portion of the curve is identified by reference numeral 16.

It may be noted that the two curves of FIG. 3 show a pattern which is generally symmetrical about the zero axis, thus demonstrating the irreversible characteristic of the Barkhausen effect. The curves also demonstrate that the range of variation of the magnetic field encompasses that portion of the magnetization curve for the material under analysis at which the Barkhausen effect is at a maximum.

A presentation like FIGURE 3 is readily obtainable for a given point on a test specimen with the apparatus of either FIGURE 1 or 2. The data represented by this signal pattern can be examined in a number of ways for correlation with stress, one of which is shown in FIGURE 4.

Figure 4:
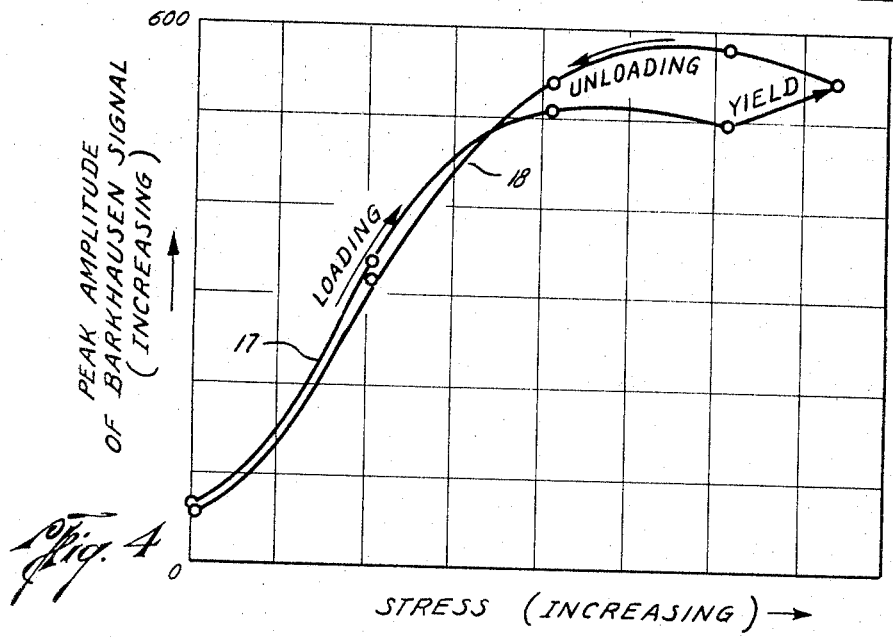
FIG. 4 shows the correlation between the peak amplitude values of Barkhausen signals, and the applied stress producing such signals, extending over a range of stress somewhat greater than the elastic limit of such material at the area of investigation.

In FIGURE 4, the peak amplitudes as determined from curves similar to FIGURE 3 at various loading conditions are plotted against the calculated stress in the specimen produced by such loadings. In other words, at a known stress condition, created for example by the application of a known load, a particular area on the test specimen is magnetically energized, and the derived Barkhausen signal displayed by apparatus similar to that of FIGURE 1 or 2. The peak amplitude value is plotted, and then the loading on the specimen is changed and a new determination made. The relationship between peak amplitude and calculated stress is clear from FIGURE 4, and it also can be seen that except where the stress was approaching or beyond the elastic limit of the material, data obtained during loading (reference numeral 17) and unloading (reference numeral 18) repeated fairly well.

The peak amplitude values plotted in FIG. 4 could be obtained without plotting a group of curves of the FIG. 3 type, as the value of the magnetic field which produced such amplitude is not required. Thus, the needle deflections of a meter responsive to the output of the demodulating circuit could be observed for maximum value, without reference to the associated value of H.

Figure 5:
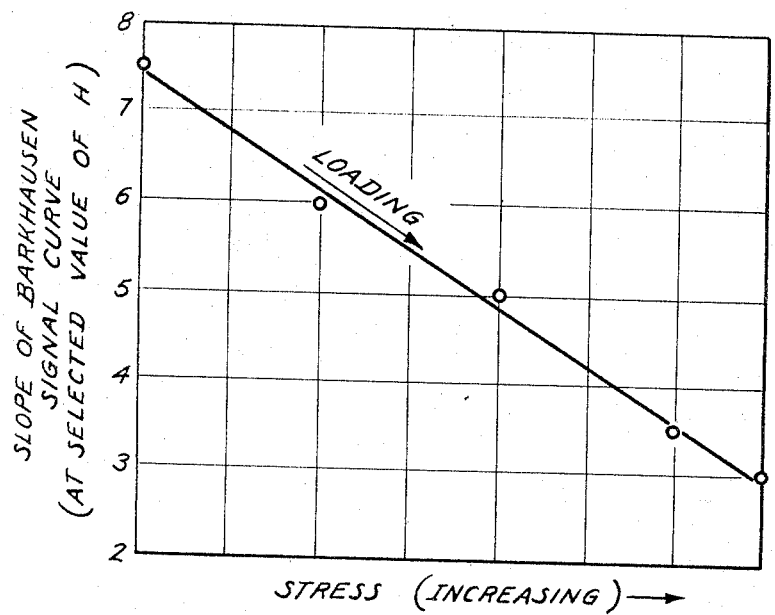
FIG. 5 shows the correlation between the slope of a group of Barkhausen signal curves of the type shown in FIG. 3, determined at a selected value of magnetic intensity, and an applied stress varying from zero to the vicinity of the elastic limit of the material at the area of investigation.

It is also of interest to note that under some circumstances, certain characteristics of FIG. 3 curves may show an approximately linear relationship with stress. Such relationship obviously will be of assistance in making quantitative evaluations. For example, FIG. 5 shows the slopes of a series of Barkhausen signal curves, each determined at a selected magnetic intensity near the saturation level, plotted against stress values as in FIGURE 4. It can be seen that the slope at the selected condition decreases uniformly over the observed range which extends to the vicinity of the yield point of the material. Excellent repeatability of data has been observed in tests of this nature.

It will be apparent that the apparatus shown in FIGS. 1 and 2 and the graphs of FIGS. 3, 4, and 5 represent the tools which can be used in a stress investigation. The manner in which these tools are employed depends in large measure upon the type of information desired, and the nature of the specimen involved. Some examples will illustrate the utility of the invention.

As indicated above, magnetic domains are sensitive both to externally applied magnetic fields and to externally applied forces, but they do not respond in the same way. An applied stress enlarges the domains whose magnetization vectors are aligned with or opposite, i.e., 180°, to its tensile axis, whereas an applied magnetic field tends to enlarge domains which are aligned in its direction but not those opposed, i.e., 180°, thereto. As a consequence of this difference, substantial amounts of Barkhausen noise are generated by the application of a magnetic field to a specimen already under appreciable tensile loading, whereas relatively little noise is produced by the application of an external field to a specimen under compression, assuming in both cases that the direction of the applied field is along the axis of loading. Thus, only a very general impression of the characteristic behavior of a material is required to ascertain whether an area of investigation is under tensile stress.

There are many situations in which extremely valuable engineering information can be obtained by a very simple analysis. For example, apparatus similar to that illustrated in FIG. 2 has been used for exploratory measurements on the steel axles of large aircraft. It had been supposed that residual stresses were created within such axles during use as a consequence of their consistent loading in one direction, but a relatively simple program yielded new insight. Tests on a new axle, a reprocessed axle, and an axle secured in the landing gear strut showed that the surface remained in substantially uniform residual compression, the magnitude of which did not vary appreciably during loading or service. This result was confirmed by a comparable inspection of a reprocessed axle which had not been shot-peened as is customary in manufacture. It was found to generate a substantially higher Barkhausen signal than the other test specimens, an indication of a lower level of residual compression.

In those situations in which quantitative information is desired, the capabilities of the invention are limited primarily by the availability of suitable analogue specimens, as defined herein, and the complexity of the item to be tested. Where the configuration is relatively simple and an analogue specimen is available for correlating the Barkhausen signal with known stress, fairly reliable information can be obtained. For example, a stress relieved analogue specimen can be subjected to a series of known loads or stresses, and at each level of loading a characteristic Barkhausen signal curve like FIG. 3 can be derived. Such curves then can be analyzed and presented in a suitable form, as by plotting peak amplitude values against stress as in FIG. 4, or slope values against stress as in FIG. 5 or other characteristic values as appropriate. The resulting comparison can be used as the basis for determination of the actual stress condition in the test specimen as revealed by its observed Barkhausen signal. The test specimen can be investigated in a loaded condition, or in any other convenient manner calculated to yield information regarding applied or residual stresses.

There are situations in which information obtained at one portion of a test specimen can be used in analyzing the information obtained at other points on the same specimen. In this case the test specimen also would function as the analogue specimen.

Although this invention involves materials which generate Barkhausen noise pulses, its application is not limited to investigating such materials. A strip or area of magnetic material can be firmly secured to the surface of a non-magnetic test specimen prior to loading, as by bonding or plating, and such strip or area will respond to surface stresses produced by the application of loads just as a conventional electric strain gage will reflect the surface strain of an item to which it is attached.

The versatility of the present invention is apparent, and although its full potential has not been explored, it offers an extremely useful and convenient avenue for obtaining valuable stress information. The extent of use of the method will be determined to some extent by the availability of other means for obtaining the same information, but it undoubtedly will prove to be suitable in numerous applications, and it is desired to protect by Letters Patent all such applications which fall within the scope of the following claims.

We claim:

1. A method for non-destructive investigation of the stress condition of a magnetic material comprising the steps of:
    (a) applying a magnetic field to the area of the material to be investigated;
    (b) varying the intensity of the applied magnetic field over a substantial range;
    (c) detecting the Barkhausen noise generated by the material in response to the variations in the magnetic field at the area being investigated;
    (d) demodulating the Barkhausen noise to derive a Barkhausen signal, in which signal there is manifested appreciable tensile stress by the presence of substantial amounts of Barkhausen noise, and appreciable compressive stress by the absence of substantial amounts of Barkhausen noise; and,
    (e) displaying the Barkhausen signal for observation and analysis.

2. The method of claim 1 in which the applied magnetic field is reversed in direction over the range of variation, and brought to substantially the same intensity at each end of the range.

3. The method of claim 1 in which the range of variation of the applied field spans a point of maximum intensity of the generated Barkhausen noise.

4. The method of claim 1 in which the Barkhausen signal is displayed graphically as a function of the intensity of the applied magnetic field.

5. The method of claim 1 in which the Barkhausen signal is derived by filtering, rectifying and integrating the detected Barkhausen noise.

6. The method of claim 1 in which steps (a), (b), (c), (d), and (e) are performed repeatedly, with incremental changes in the direction of the applied field between each repetition to establish the approximate direction of the maximum tensile stress.

7. A method for non-destructive investigation of the stress condition of a test specimen of magnetic material comprising the steps of:
    (a) subjecting an analogue specimen of known stress condition to a magnetic field of varying intensity;
    (b) detecting the Barkhausen noise generated by the analogue specimen in response to the variations in the applied field;
    (c) demodulating the Barkhausen noise to derive a Barkhausen signal for display;
    (d) repeating steps (a), (b), and (c) on the test specimen at a region of interest; and,
    (e) comparing the characteristics of the Barkhausen signal of the analogue specimen with those of the test specimen, thereby to establish the stress condition of the latter.

8. The method of claim 7 in which the Barkhausen signal is displayed graphically as a function of field intensity to facilitate comparison of the characteristic signals of the analogue and test specimens.

9. The method of claim 7 in which steps (a), (b), and (c) are performed repeatedly on the test specimen, and the direction of the applied magnetic field altered incrementally between each repetition, thereby to establish the direction of maximum tensile stress.

10. A method for non-destructive investigation of the stress condition of a test specimen of magnetic material comprising the steps of:
    (a) subjecting a stress relieved analogue specimen to incremental loading to produce known stress conditions over the range of interest;
    (b) applying a magnetic field of varying intensity to the analogue specimen at each increment of loading, and detecting the resulting Barkhausen noise;
    (c) deriving and displaying a Barkhausen signal from the Barkhausen noise at each increment of loading;
    (d) applying a magnetic field of varying intensity to the test specimen and detecting the resulting Barkhausen noise;
    (e) deriving and displaying a Barkhausen signal from the Barkhausen noise; and,
    (f) comparing the Barkhausen signal characterizing the test specimen with those characterizing known loading conditions of the anologue specimen, thereby to establish the approximate stress condition of the former.

11. The method of claim 10 in which the Barkhausen signals characterizing the analogue specimen at known loading conditions are analyzed for a feature manifesting first order correlation with stress, and the stress in the test specimen is ascertained by reference to the correlating feature of its characteristic Barkhausen signal.

12. The method of claim 10 in which the pattern of peak amplitude values of the Barkhausen signals characterizing the analogue specimen at known loading conditions are compared with the peak amplitude value characterizing the test specimen to ascertain the stress condition of the latter.

13. A method for investigating the surface stress of an object of non-ferromagnetic material resulting from application of a load comprising the steps of:
    (a) securing a test strip of magnetic material at the region of interest on the object, while the object is unstressed;
    (b) applying the stress-producing load to the object;
    (c) applying a magnetic field of varying intensity to the test strip;
    (d) detecting the Barkhausen noise resulting from the variations in the intensity of the magnetic field; and,
    (e) deriving and displaying the resulting Barkhausen signal for observation and analysis, in which signal there is manifested appreciable tensile stress by the presence of substantial amounts of Barkhausen noise, and appreciable compressive stress by the absence of substantial amounts of Barkhausen noise.

14. A system for deriving and displaying the Barkhausen signal generated within a body of magnetic material responsive to a variable magnetic field comprising:
    (a) an energizing coil;
    (b) an oscillator connected to said coil for passing an alternating current therethrough;

(c) detecting means within the magnetic field created by said energizing coil adapted for response to variations in magnetic flux density;

(d) amplifying, filtering and demodulating means connected to said detecting means for deriving a Barkhausen signal from the pulses emanating therefrom, in which signal there is manifested appreciable tensile stress by the presence of substantial amounts of Barkhausen noise, and appreciable compressive stress by the absence of substantial amounts of Barkhausen noise; and (e) display means connected to said demodulating means for presenting the Barkhausen signal.

15. The system of claim 14 in which said display means is connected to said oscillator to present the Barkhausen signal as a function of energizing current.

References Cited

UNITED STATES PATENTS 3,178,934   4/1965   O'Regan _____ 73—88

OTHER REFERENCES

Encyclopaedic Dictionary of Physics, vol. 1, pp. 371–372, Pergamon Press (1961).

Williams, W. D., Magnetostriction Phenomena, General Electric Review, pp. 161–163, March 1942.

RICHARD C. QUEISSER, *Primary Examiner.*

C. A. REUHL, *Assistant Examiner.*

U.S. Cl. X.R.

324—34

UNITED STATES PATENT OFFICE
CERTIFICATE OF CORRECTION

Patent No. 3,427,872 February 18, 1969

Richard W. Leep et al.

It is certified that error appears in the above identified patent and that said Letters Patent are hereby corrected as shown below:

Column 4, lines 22 and 23, "a Barkhausen signal can be generated and disverted" should read -- the variations in the Barkhausen noise level, converted --.

Signed and sealed this 24th day of March 1970.

(SEAL)
Attest:

Edward M. Fletcher, Jr.
Attesting Officer

WILLIAM E. SCHUYLER, JR.
Commissioner of Patents